United States Patent
Alam et al.

(10) Patent No.: US 10,304,229 B1
(45) Date of Patent: May 28, 2019

(54) COGNITIVE MULTI-LAYERED REAL-TIME VISUALIZATION OF A USER'S SENSED INFORMATION

(71) Applicant: International Business Machines Corporation, Armonk, NY (US)

(72) Inventors: Nebula Alam, Melbourne (AU); Mahathir Almashor, Melbourne (AU); Adam Eberbach, Melbourne (AU); Josh Andres Jorge Ortiz, Melbourne (AU); Shaila Pervin, Melbourne (AU)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/819,755

(22) Filed: Nov. 21, 2017

(51) Int. Cl.
| | |
|---|---|
| *G06T 11/60* | (2006.01) |
| *G06T 13/40* | (2011.01) |
| *G06T 13/80* | (2011.01) |
| *G06Q 50/00* | (2012.01) |

(52) U.S. Cl.
CPC .............. *G06T 11/60* (2013.01); *G06Q 50/01* (2013.01); *G06T 13/40* (2013.01); *G06T 13/80* (2013.01)

(58) Field of Classification Search
CPC .......... G06T 13/40; G06T 11/60; G06Q 50/01
See application file for complete search history.

(56) References Cited

U.S. PATENT DOCUMENTS

| | | | | |
|---|---|---|---|---|
| 7,636,779 B2* | 12/2009 | Hayashi | ............ | G06F 17/30867 709/224 |
| 2008/0201638 A1* | 8/2008 | Nair | ........................ | G06T 11/00 715/706 |
| 2009/0300525 A1* | 12/2009 | Jolliff | ................ | H04M 1/72544 715/764 |
| 2010/0115426 A1* | 5/2010 | Liu | ...................... | G06Q 10/107 715/757 |
| 2013/0282808 A1* | 10/2013 | Sadanandan | ........... | G06Q 10/10 709/204 |
| 2016/0048296 A1* | 2/2016 | Gan | ........................ | G06F 3/147 715/745 |
| 2016/0307028 A1* | 10/2016 | Fedorov | .................. | G06T 11/60 |

FOREIGN PATENT DOCUMENTS

WO    WO 2015/164951 A1    11/2015

OTHER PUBLICATIONS

Mel, et al. "The NIST Definition of Cloud Computing". Recommendations of the National Institute of Standards and Technology. Nov. 16, 2015.

* cited by examiner

*Primary Examiner* — Robert J Craddock
(74) *Attorney, Agent, or Firm* — Grant Johnson, Esq.; McGinn IP Law Group, PLLC

(57) ABSTRACT

A computer-implemented real-time visualization method, system, and computer program product including determining a current sentiment and a current state of a user from user data, creating at least one layer including at least one of an image and an animation based on at least one of an aggregation and a combination of the current sentiment and the current state of the user, and compiling the at least one layer into a single image or a single animation for display on an image display medium.

20 Claims, 7 Drawing Sheets

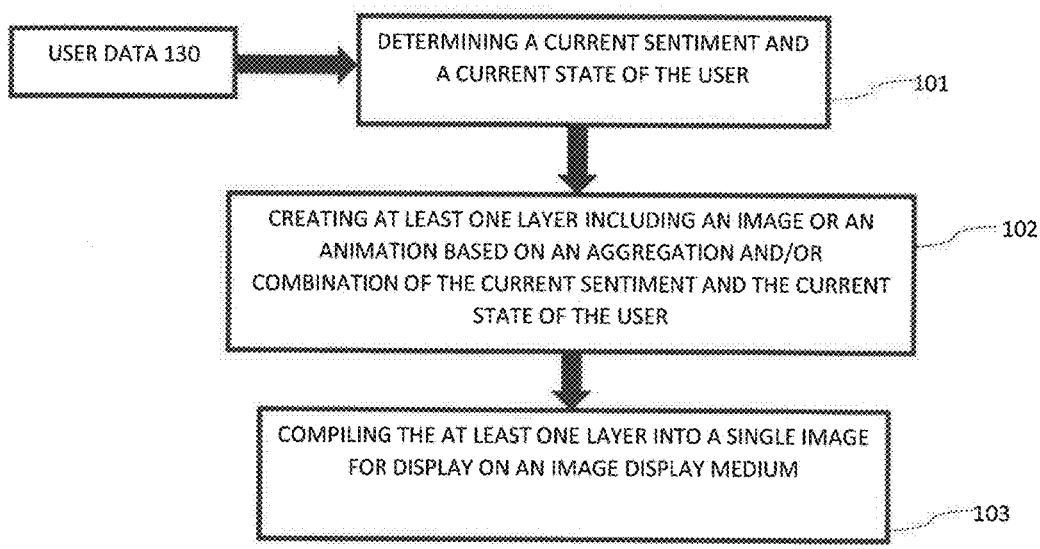

COGNITIVE MULTI-LAYERED REAL-TIME VISUALIZATION OF A USER'S SENSED INFORMATION

BACKGROUND

The present invention relates generally to a real-time visualization method, and more particularly, but not by way of limitation, to a method, a computer program product, a system, and an apparatus for a cognitive multi-layered real-time visualization of a user's sensed information to create a dynamic multi-layered image representing a user's status and environment.

Conventionally, online profile pictures and physical photos are static and require manual uploading or replacement. The images do not reflect a current state of the user automatically and in real-time. The images do not provide up-to-date information of the user to a follower, for example, a family member having a picture frame with the static image or a fan following a celebrity on a social media platform.

That is, it is time-consuming for a user to keep a photograph updated, and to frequently provide multi-layered information about themselves. This process also requires constant connectivity, and is usually biased or inaccurate in some way.

Thus, the inventors have recognized a problem in the art that there is a need for a real-time visualization of sensed user information within a dynamic photograph to provide a convenient, non-intrusive and abstract way to communicate in real-time, using social network profiles and/or physical digital picture frames.

SUMMARY

In an exemplary embodiment, the present invention provides a computer-implemented real-time visualization method, the method including determining a current sentiment and a current state of a user from user data, creating at least one layer including an image and/or an animation based on an aggregation and/or a combination of the current sentiment and the current state of the user, and compiling the at least one layer into a single image for display on an image display medium.

One or more other exemplary embodiments include a computer program product and a system.

The above summary will be described in more detail below with reference to the drawings. The invention is capable of embodiments in addition to those described and of being practiced and carried out in various ways. It is thus to be understood that the invention is not limited in its application to the details of construction and to the arrangements of the components set forth in the following description or illustrated in the drawings. Also, it is to be understood that the phraseology and terminology employed herein, as well as the abstract, are for the purpose of description and should not be regarded as limiting.

As such, those skilled in the art will appreciate that the present invention may readily be utilized as a basis for the designing of other structures, methods and systems for carrying out the several purposes of the present invention. It is important, therefore, that the claims appended hereto be regarded as including such equivalent constructions insofar as they do not depart from the spirit and scope of the present invention.

BRIEF DESCRIPTION OF THE DRAWINGS

Aspects of the invention will be better understood from the following detailed description of the exemplary embodiments of the invention with reference to the drawings, in which:

FIG. 1 depicts a high-level flow chart for a computer-implemented real-time visualization method 100, according to an embodiment of the present invention;

DETAILED DESCRIPTION

Figure 2A:
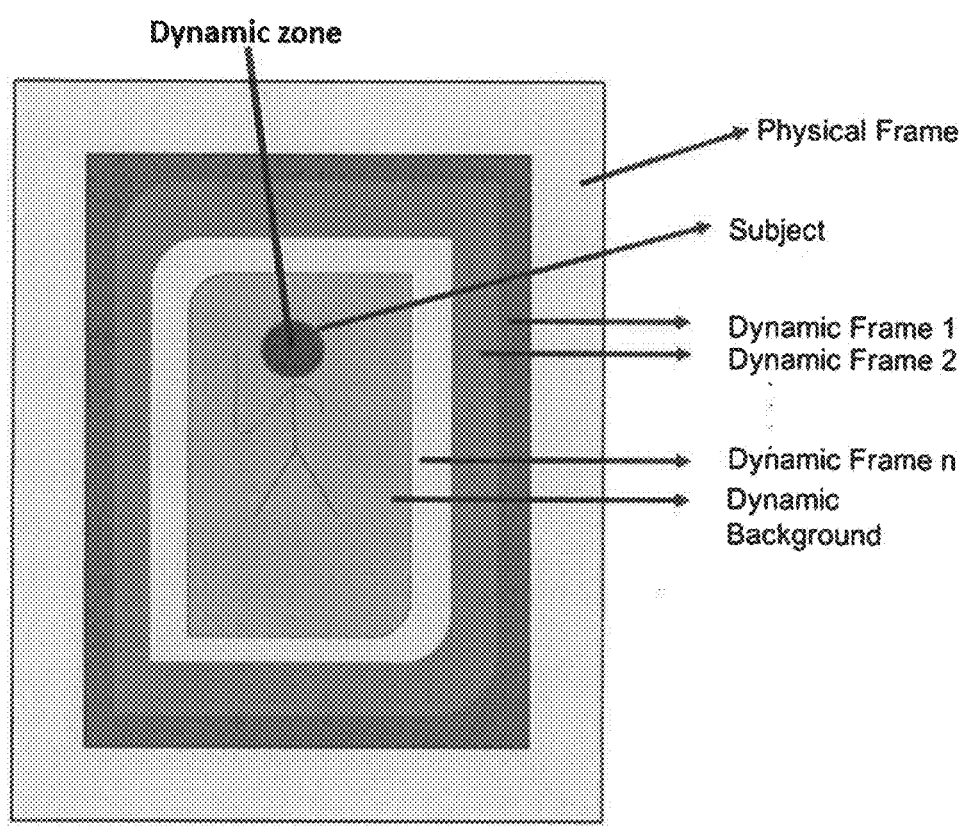
FIGS. 2A-2C exemplarily depicts an image display apparatus 200 according to an embodiment of the present invention.

The invention will now be described with reference to FIGS. 1-5, in which like reference numerals refer to like parts throughout. It is emphasized that, according to common practice, the various features of the drawing are not necessarily to scale. On the contrary, the dimensions of the various features can be arbitrarily expanded or reduced for clarity. Exemplary embodiments are provided below for illustration purposes and do not limit the claims.

With reference now to FIG. 1, a real-time visualization method 100 according to an embodiment of the present invention includes various steps which can create a dynamic multi-layered image representing a user's status and environment. The rendered image can be shown online via a user's profile picture on a social network, and/or physically via a connected digital image frame. Each layer of the rendered image displays different contextual information. For example the method can include steps for creating a first layer as an actual image of the user representing her current activity (e.g., sleeping, working, etc.), a second layer of the user's facial expression is then adjusted to reflect her emotional state, a third layer of the current weather at their location, and a fourth layer of a background of the image shows the city where they are in.

As depicted in FIG. 1, the method 100 continuously receives user data 130 of which, in step 101, a current state and a current sentiment of the user is determined based on the user data 130. The user data 130 can be input for processing by the method by, for example, wearables such as Global Position System (GPS) trackers, heart rate and sleep monitors, Internet of Things (IoT) devices, such as smart electricity and smart thermostats, weather data from weather application programming interfaces (APIs), social media posts and images data mined from social media, including past images for deep-learning and facial recognition, calendar entries, a location and other data from personal devices (e.g., phones, tablets, laptops), etc. That is, the user data 130 includes user data related to a sentiment of the user (e.g., how the user is feeling) and a current state of the user (e.g., a location of the user, an activity of the user, etc.). The sentiment data can be utilized to predict whether the user is happy, sad, hot, cold, etc. such that, for example, if the user is happy, the user's face can depict a smile in the output single image. Similarly, the current state of the user can be utilized to create additional layers such as, a background layer based on a location of the user, a temperature indicating layer according to the weather, etc.

In step 102, at least one layer is created, the one layer including an image or an animation based on an aggregation and/or a combination of the current sentiment and the current state of the user. For example, in step 102, an image or animation can be assigned based on an aggregation or combination of the gathered data. For example, the method 100 receives the subject's location information, and then obtains weather data for that location from available online services. Consequently, the background of the rendered image (i.e., a background layer) displays an iconic landmark from at/nearby the user's location, with an overlay representing the current weather at that location. An example of this would be an image of clouds forming above a darkened Sydney Opera House. Also, in step 102, based on other data received such as the user's social media posts, calendar information to derive her activities and schedule, heart rate and sleep quality, using cognitive services such as the Watson Tone Analyzer™ and Personality Insights™, the user's current sentiment is derived and rendered as an appropriate facial expression (e.g., a layer of the image). An example of this would be her facial expression dynamically adjusted to a frown, if her communications are negative in nature and she had insufficient sleep.

In step 102, a change in the current sentiment and the current state of the user can be continuously detected to constantly represent the user's current status and current emotional state in real-time.

Moreover, in step 102, additional layers can be created beyond a background layer and a user image layer (e.g., a picture of the user). For example, other layers can be created to represent information such as, but not limited to, the subject's current activity, audio-visual experiences of the subject (e.g., lyrics of music, movie posters), etc.

In step 103, each layer of the at least one layer (or a single layer) is compiled into a single image for display on an image display medium (e.g., a social media avatar, a profile picture, on a physical image frame in a home, etc.). The single image can be sent to a possible multitude of receivers, such as a physical display frame in the home of the subject's parents, or an awaiting service on her chosen social network. As and when new information becomes available, the server repeats this procedure and re-broadcasts the subject's latest state. In this manner, the images already created (e.g., past images) can be dynamically updated in real-time.

Figure 2B:
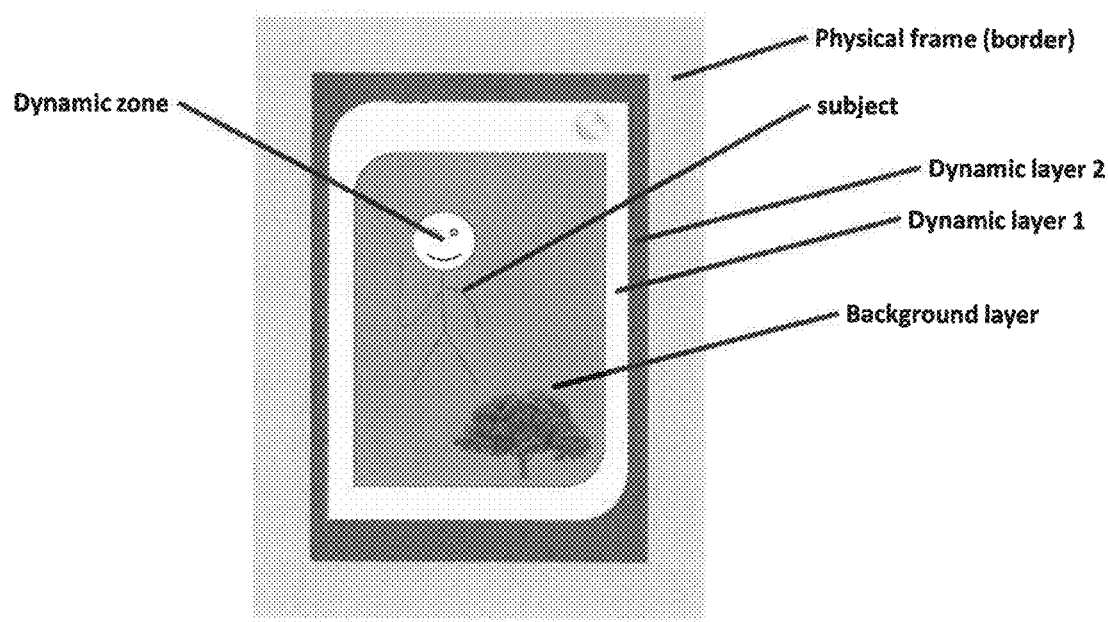
Figure 2C:
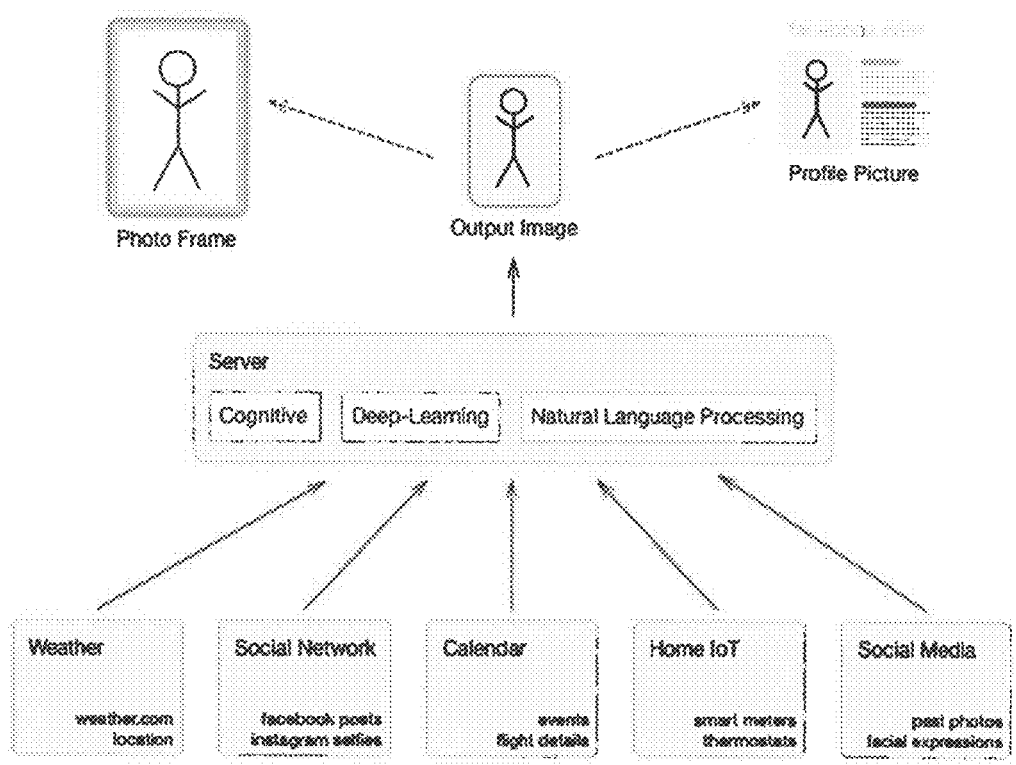

That is, as shown in FIG. 2C, the method 100 can receive user data 130 from multiple sources (e.g., weather, social network, calendar, IoT, social media, etc.), create at least one layer representing a state and sentiment of a user, and compile the at least one layer to an output image for display in, for example, a photograph frame, a profile picture, etc.

For example, in one embodiment, a user can be at the office working and the time is 4:59 PM. The last image created had the user having a tired facial expression, with a background layer of the user in their office, and an outer layer as a sunny border indicating the nice weather outside. At 5:01 PM, when the user clocks out of work and leaves the office, the new user data 130 can dynamically change the image and now indicate that the user is very excited/happy as a facial expression, a background layer can include the user at their next destination (e.g., a restaurant based on calendar data or text messages indicating their nightly plans), and a sunset as the outer frame because the sun is starting to set. Therefore, a user's social media picture, for example, can be dynamically updated to indicate a real-time status of the user for their followers. Also, if the user has linked the method 100 with photograph frames, the photograph frames can update with the updated photograph such that family members or friends can see the user's current state and sentiment.

Thereby, the method 100 can output a compiled single image to a physical photograph frame (e.g., as exemplarily depicted in FIG. 2B) that receives the compiled information from the server. The frame is always connected, and sits on the desktop of a person that follows the subject. Note that in this example, the contextualized layers are visually separated using distinct dynamic frames.

In another embodiment, the multiple layers are compiled into a single image for display, which is a more subtle way to incorporate the semantically distinct information. This is ideal for use in social media profiles, mobile-phone backgrounds/lock-screens and as advertising material. There are advantages to both approaches, with the dynamic frames being more visually discernible while the single image being a more natural visualization.

It is noted that a frame having distinct different layers and borders can be included but that the sum of the layers and bordered is a "single image". Each layer can be a separate dynamic frame. Alternatively, a single image can be compiled which integrates each of the dynamic layers together as the single image instead of populating each frame separately.

As discussed above, and with reference to FIGS. 2A-2B, a physical photograph frame can be the image display medium that receives the compiled information from the method 100. The frame is always connected, and sits on the desktop of a person that follows the subject. Note that in this example, the contextualized layers are visually separated using distinct dynamic frames. Moreover, the so called "physical frame" can simply be a border or the dimensions of the display apparatus or medium (e.g., the size of a profile picture and the outer border of the profile picture on the social media website is the physical frame). As noted, in one embodiment, the subject can include a dynamic field of which the clothing, hair style, posture, poses, general demeanor, body language, etc. can be dynamically updated and generated according to a current sentiment and a current state. Further, a face of the subject can be an additional dynamic generated field for generating facial expressions (e.g., sad as a frown, happy as a smile, red as warm cheeks, sweat drops on their brow when working out, etc.). The subject themselves (i.e., a picture of the user) can have multiple dynamically updating fields according to a user preference (e.g., some users may require their shoes, pants, shirt, hands, etc. be dynamically updated if say, the user is a fashion model). The dynamic zone, the subject, the dynamic background, a first, second, n dynamic frame each are a layer created to represent a different type of sentiment or state. For example, the background layer can include nature surrounding the user (as shown in FIG. 2B), a picture of a venue at which the user is visiting (e.g., if the user is in a museum), etc. Each additional dynamic frames 1, 2, . . . n (where n is an integer) can be included as a user preference to describe additional emotions or context of the user. In one embodiment, a dynamic frame can include a weather banner showing the current weather of the user, a second dynamic frame can include a color meter changing colors based on how a user is feeling (e.g., purple sick, green=hungry, etc.). That is, the single image can be comprised of many dynamically generated layers each representing a different state and/or sentiment of the user. Each image display medium can include features to select the number of dynamic frames (i.e., layers) to include with the generated images and what each dynamic layer should represent.

Thus, the method 100 can compile a rendered multi-layered image displayable on user's social network profiles and/or a physical photograph frame. The single image interprets sensed information about a user and visualizes it within the image. The user data 130 can be taken from an IoT approach that brings vibrancy and dynamism to static photos and various applications, such as in social media profiles, smart device photos, billboard advertisements, and photograph frames.

The single image can therefore passively communicate with fans, family and friends remotely with minimal to no effort. For example, a photograph of important family and friends change in real time to reflect multi-layered state-changes and the compiled single image with the layers can makes profile pictures alive and dynamic on all social media accounts.

Figure 3:
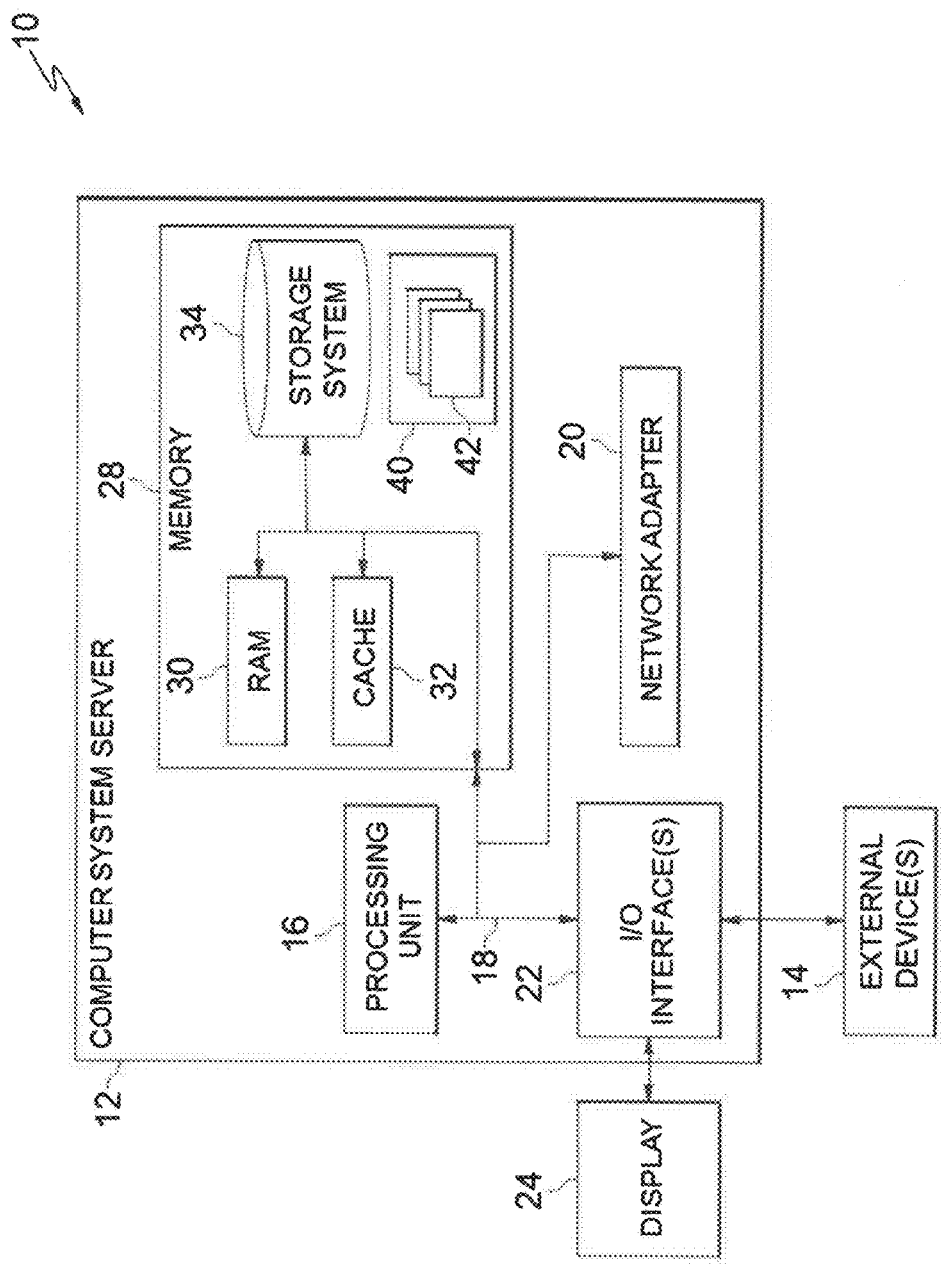
FIG. 3 depicts a cloud computing node according to an embodiment of the present invention.

Referring also now to FIG. 3, one or more computers of a computer system 12 according to an embodiment of the present invention can include a memory 28 having instructions stored in a storage system to perform the steps of FIG. 1 via the controller 205 that can include the memory 28.

As will described/illustrated in more detail below, one or more embodiments of the present invention may be implemented in a cloud environment (see e.g., FIGS. 3-5). It is nonetheless understood that the present invention can be implemented outside of the cloud environment.

Exemplary Hardware Aspects, Using a Cloud Computing Environment

Although this detailed description includes an exemplary embodiment of the present invention in a cloud computing environment, it is to be understood that implementation of the teachings recited herein are not limited to such a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client circuits through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

FIG. 3 depicts a an example of a computing node in accordance with the present invention. Although computing node 10 is depicted as a computer system/server 12, it is understood to be operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop circuits, multiprocessor systems, microprocessor-based systems, set top boxes, programmable consumer electronics, network PCs, minicomputer systems, mainframe computer systems, and distributed cloud computing environments that include any of the above systems or circuits, and the like.

Computer server 12 is only one example of a suitable computing node and is not intended to suggest any limitation as to the scope of use or functionality of embodiments of the invention described herein. Regardless, computer server 12 is capable of being implemented and/or performing any of the functionality set forth herein.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in cloud computing environments (see e.g., FIG. 3) where tasks are performed by remote processing circuits that are linked through a communications network. In a distributed cloud computing environment, program modules may be located in both local and remote computer system storage media including memory storage circuits.

Referring again to FIG. 3, computer system/server 12 is shown in the form of a general-purpose computing circuit. The components of computer system/server 12 may include, but are not limited to, one or more processors or processing units 16, a system memory 28, and a bus 18 that operably couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. In some embodiments, program modules 42 generally carry out the functions and/or methodologies of embodiments of the invention as described herein.

Computer system/server 12 may also communicate with one or more external devices 14 such as a keyboard, a pointing circuit, a display 24, a camera, etc.; one or more circuits that enable a user to interact with computer system/server 12; and/or any circuits (e.g., network card, modem, etc.) that enable computer system/server 12 to communicate with one or more other computing circuits. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, circuit drivers, redundant processing units, external disk drive arrays, RAID systems, tape drives, and data archival storage systems, etc.

Figure 4:
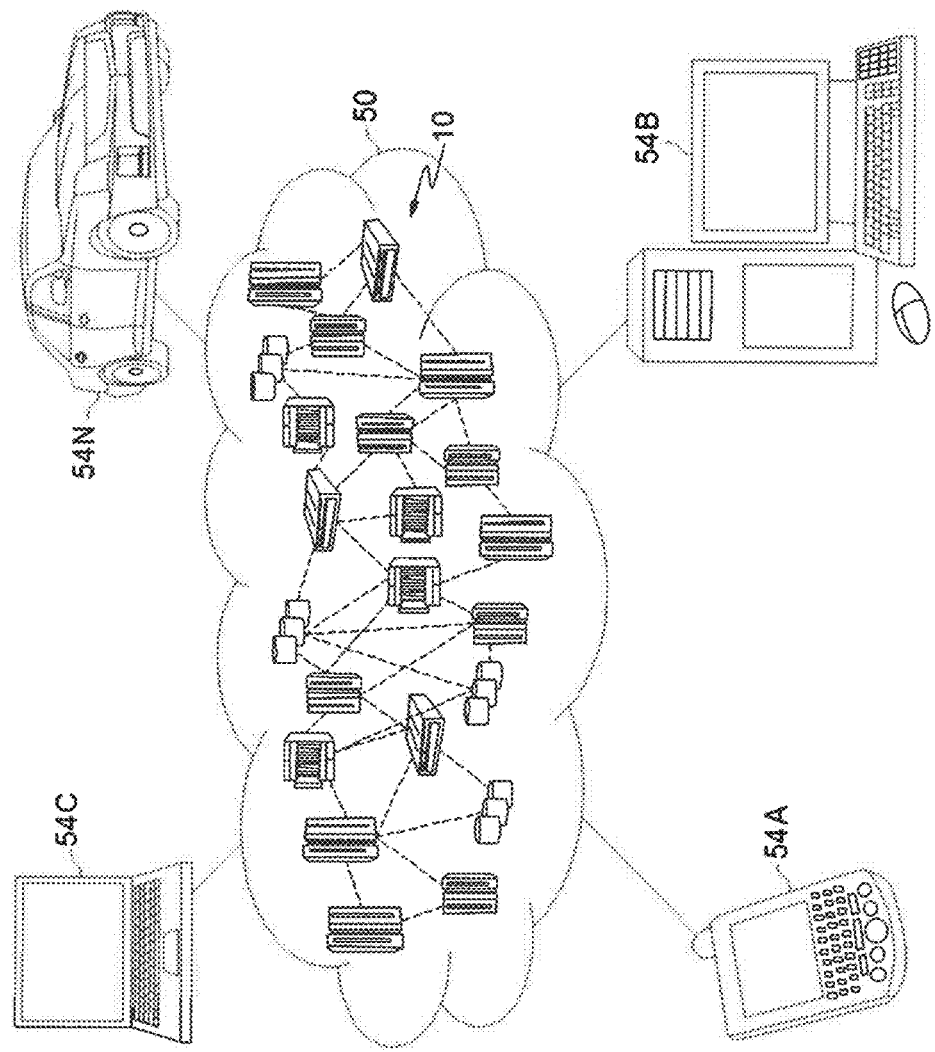
FIG. 4 depicts a cloud computing environment according to an embodiment of the present invention.

Referring now to FIG. 4, illustrative cloud computing environment 50 is depicted. As shown, cloud computing environment 50 comprises one or more cloud computing nodes 10 (e.g., computer system 12 (FIG. 3) with which local computing circuits used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing circuit. It is understood that the types of computing circuits 54A-N shown in FIG. 4 are intended to be illustrative only and that computing nodes 10 and cloud computing environment 50 can communicate with any type of computerized circuit over any type of network and/or network addressable connection (e.g., using a web browser).

Figure 5:
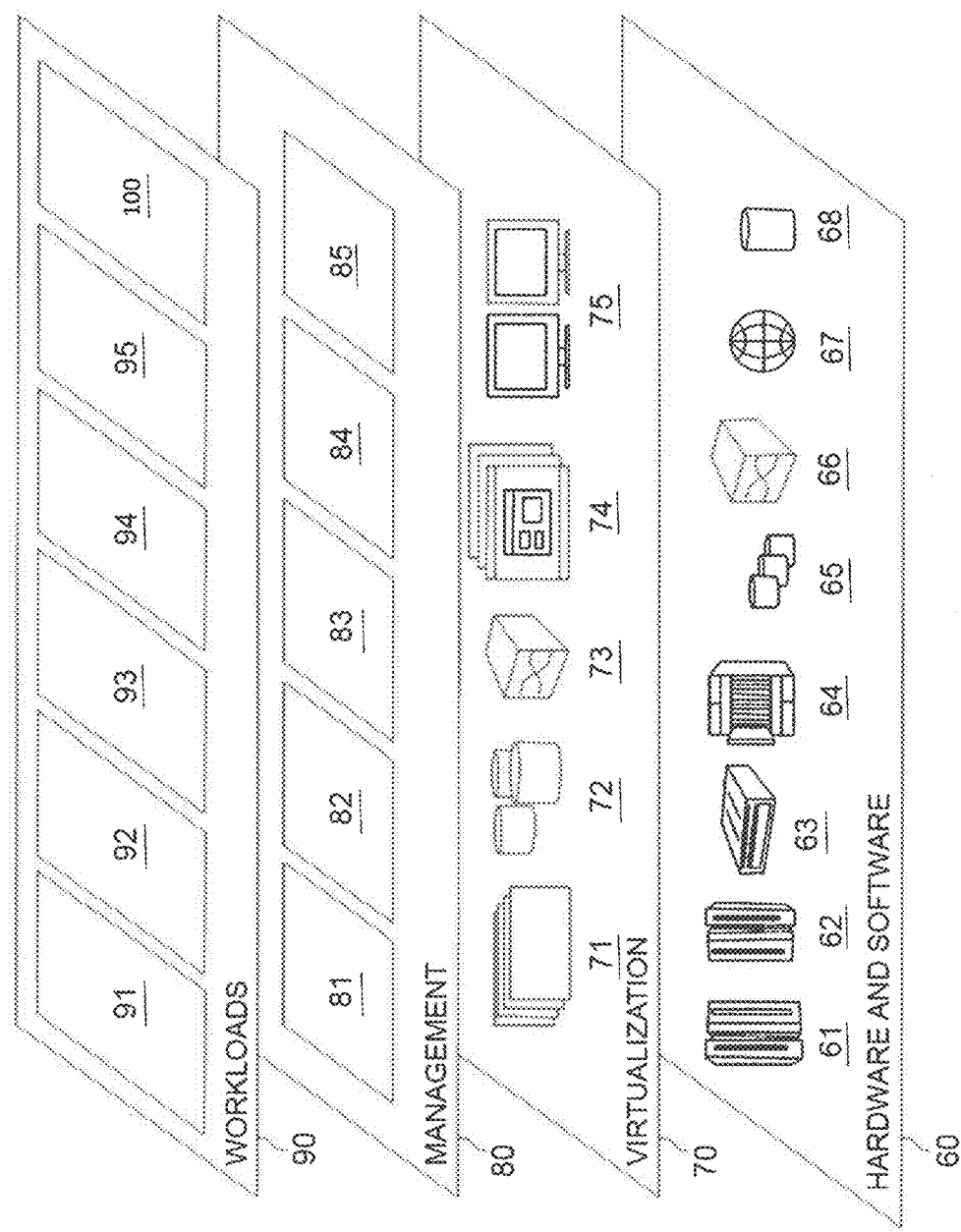
FIG. 5 depicts abstraction model layers according to an embodiment of the present invention.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage circuits 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, more particularly relative to the present invention, the real-time visualization method 100.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Further, Applicant's intent is to encompass the equivalents of all claim elements, and no amendment to any claim of the present application should be construed as a disclaimer of any interest in or right to an equivalent of any element or feature of the amended claim.

What is claimed is:

1. A computer-implemented real-time visualization method, the method comprising:
    determining a current sentiment and a current state of a user from user data;
    creating at least one layer including at least one of an image and an animation based on at least one of an aggregation and a combination of the current sentiment and the current state of the user; and
    compiling the at least one layer into a single image or a single animation for display on an image display medium to dynamically modify a current image to include a different image or a different animation depicting the current sentiment and the current state of the user in addition to the image.

2. The method of claim 1, wherein each of the at least one layer includes a dynamic field that is created by the creating to represent a different type of the current sentiment or the current state of the user.

3. The method of claim 1, wherein the at least one layer includes a subject layer, a facial expression layer, and a background layer such that the compiled single image or the single animation depicts the user, a facial expression of the user, and a background where the user is located.

4. The method of claim 1, wherein the creating interprets the current sentiment and the current state of the user to create a visualization of the user embodying the current sentiment and the current state within the single image.

5. The method of claim 1, wherein the user data is received from at least one of:
    an Internet of Things (IoT) device;
    a wearable device biometric data;
    weather data;
    a calendar entry; and
    location data.

6. The method of claim 1, wherein the creating continuously detects a change in the current sentiment and the current state of the user to constantly represent the user's current status and state in real-time.

7. The method of claim 1, wherein the compiling recompiles a new single image or a new single animation each time a change in the current sentiment and the current state of the user is changed.

8. The method of claim 1, embodied in a cloud-computing environment.

9. A non-transitory computer program product, the computer program product comprising a computer readable storage medium having program instructions embodied therewith, the program instructions executable by a computer to cause the computer to perform:
    determining a current sentiment and a current state of a user from user data;
    creating at least one layer including at least one of an image and an animation based on at least one of an aggregation and a combination of the current sentiment and the current state of the user; and
    compiling the at least one layer into a single image or a single animation for display on an image display medium to dynamically modify a current image to include a different image or a different animation depicting the current sentiment and the current state of the user in addition to the image.

10. The non-transitory computer program product of claim 9, wherein each of the at least one layer includes a dynamic field that is created by the creating to represent a different type of the current sentiment or the current state of the user.

11. The non-transitory computer program product of claim 9, wherein the at least one layer includes a subject layer, a facial expression layer, and a background layer such that the compiled single image or the compiled single animation depicts the user, a facial expression of the user, and a background where the user is located.

12. The non-transitory computer program product of claim 9, wherein the creating interprets the current sentiment and the current state of the user to create a visualization of the user embodying the current sentiment and the current state within the single image.

13. The non-transitory computer program product of claim 9, wherein the user data is received from at least one of:
    an Internet of Things (IoT) device;

a wearable device biometric data;
weather data;
a calendar entry; and
location data.

14. The non-transitory computer program product of claim 9, wherein the creating continuously detects a change in the current sentiment and the current state of the user to constantly represent the user's current status and state in real-time.

15. The non-transitory computer program product of claim 9, wherein the compiling re-compiles a new single image or a new single animation each time a change in the current sentiment and the current state of the user is changed.

16. A real-time visualization system, the system comprising:
    a processor; and
    a memory operably coupled to the processor, the memory storing instructions to cause the processor to perform:
        determining a current sentiment and a current state of a user from user data;
        creating at least one layer including at least one of an image and an animation based on at least one of an aggregation and a combination of the current sentiment and the current state of the user; and
        compiling the at least one layer into a single image or a single animation for display on an image display medium to dynamically modify a current image to include a different image or a different animation depicting the current sentiment and the current state of the user in addition to the image.

17. The system of claim 16, wherein each of the at least one layer includes a dynamic field that is created by the creating to represent a different type of the current sentiment or the current state of the user.

18. The system of claim 16, wherein the at least one layer includes a subject layer, a facial expression layer, and a background layer such that the compiled single image or single animation depicts the user, a facial expression of the user, and a background where the user is located.

19. The system of claim 16, wherein the creating continuously detects a change in the current sentiment and the current state of the user to constantly represent the user's current status and state in real-time.

20. The system of claim 16, embodied in a cloud-computing environment.

* * * * *

UNITED STATES PATENT AND TRADEMARK OFFICE
CERTIFICATE OF CORRECTION

Page 1 of 1

PATENT NO. : 10,304,229 B1
APPLICATION NO. : 15/819755
DATED : May 28, 2019
INVENTOR(S) : Nebula Alam et al.

It is certified that error appears in the above-identified patent and that said Letters Patent is hereby corrected as shown below:

On the Title Page

"(72) Inventors:", Line 4, the fourth Inventor's name should be:
Jorge Andres Moros Ortiz Signed and Sealed this
Ninth Day of February, 2021

Drew Hirshfeld
*Performing the Functions and Duties of the*
*Under Secretary of Commerce for Intellectual Property and*
*Director of the United States Patent and Trademark Office*